US006981381B1

(12) United States Patent
Wang et al.

(10) Patent No.: US 6,981,381 B1
(45) Date of Patent: Jan. 3, 2006

(54) LINEAR THERMOELECTRIC DEVICE DRIVER

(75) Inventors: Ching Wang, Austin, TX (US); Robert M. Bartel, Hillsboro, TX (US); Hans W. Klein, Danville, CA (US)

(73) Assignee: Lattice Semiconductor Corp., Hillsboro, OR (US)

( * ) Notice: Subject to any disclaimer, the term of this patent is extended or adjusted under 35 U.S.C. 154(b) by 0 days.

(21) Appl. No.: 10/737,514

(22) Filed: Dec. 16, 2003

(51) Int. Cl.
*F25B 21/02* (2006.01)

(52) U.S. Cl. .......................................... 62/3.2; 62/3.7

(58) Field of Classification Search .................. 62/3.1, 62/3.2, 3.3, 3.7

See application file for complete search history.

(56) References Cited

U.S. PATENT DOCUMENTS

| 4,364,234 | A | * | 12/1982 | Reed | 62/3.3 |
| 5,450,727 | A | * | 9/1995 | Ramirez et al. | 62/3.7 |
| 5,603,220 | A | * | 2/1997 | Seaman | 62/3.7 |
| 6,205,790 | B1 | * | 3/2001 | Denkin et al. | 62/3.7 |
| 6,636,459 | B1 | * | 10/2003 | Nagata | 368/204 |

* cited by examiner

*Primary Examiner*—Melvin Jones

(57) ABSTRACT

Device driver circuits based on H-bridges can be implemented to provide linear control of the H-bridge, reduce power losses, and reduce certain component size/cost. The driver circuits can use two feedback loops to operate the H-bridge in different regions and to guarantee that current flows through an H-bridge load device, such as a thermoelectric cooler, in only one direction at a given time. The H-bridge driver circuits can remove the possibility of high currents bypassing the load device and thus going directly through the switches on either side of the H-bridge driver. The H-bridge driver circuits also ensure careful control of the current applied to the H-bridge load device. Such driver circuits are particularly useful for controlling the current applied to thermoelectric devices.

19 Claims, 4 Drawing Sheets

LINEAR THERMOELECTRIC DEVICE DRIVER

TECHNICAL FIELD

The present invention relates to current control circuits, and particularly to circuits useful for controlling thermoelectric devices.

BACKGROUND

A thermoelectric cooler (TEC) is a semiconductor device that functions as a heat pump by taking advantage of a phenomenon known as the Peltier effect. In a system having a junction between two dissimilar metals, an electrical current passing through the junction (in a closed circuit) also causes heat to be transferred across the junction. Thus, when current is applied to a thermoelectric cooler, heat moves through the module from one side to the other in proportion to the applied current. One module face will be cooled while the other is simultaneously heated. This phenomenon is fully reversible; with a switch in the polarity of the applied current, heat moves in the opposite direction. Thus, the same module can function as both a heater and a cooler, permitting very precise temperature stabilization. Thermoelectric cooler temperature control is particularly effective for tasks requiring precise temperature control, such as laser diode cooling and temperature control for other sensitive electronic devices.

In order to maintain a stable temperature for a particular device, feedback control systems are frequently implemented. In a feedback control system, one measures the temperature of the device of interest, compares that measured temperature to a desired set point temperature, and appropriately heats or cools the device in an attempt to bring the device temperature towards the set point. FIG. 1 illustrates a simplified block diagram of a feedback temperature control system using a thermoelectric cooler.

In the system illustrated, some thermal load 100, e.g., a device whose temperature is to be controlled such as a laser diode, is thermally coupled to a thermoelectric cooler 105, which in turn is typically coupled to a heat sink 115. In this example, thermal load 100 is coupled to the "cool" side of thermoelectric cooler 105 and so the primary mechanism by which the temperature of thermal load 100 is controlled is by varying the degree to which it is cooled. A temperature sensor 110, typically a thermistor, provides a mechanism for the feedback temperature control system to measure the temperature of thermal load 100.

Temperature controller 120 provides the power needed to operate thermoelectric cooler 105 based on a temperature set point value 170 and information about the temperature of thermal load 100. A signal proportional to the temperature of thermal load 100 is provided to sensor interface 160, which typically includes an amplifier for conditioning the signal from temperature sensor 110. The conditioned signal is fed along with temperature set point 170 into a difference amplifier 130, which produces a signal that in turn operates a control function 140. Power driver 150 provides power to thermoelectric cooler module 105 based on signals from control function 140.

Many contemporary electronic systems are designed to operate from a single positive voltage supply. While single-supply operation presents no serious difficulties if one wishes to operate a thermoelectric cooler in a heat-only or cool-only mode, it does make variable heat/cool operation more complex. FIG. 2 illustrates a simplified schematic diagram of an H-bridge circuit topology, which can provide bipolar drive to a thermoelectric cooler 200 or other load while still operating from a single supply voltage. H-bridge circuit 210 is a type of current control circuit that includes switches 220, 230, 240, and 250 arranged with respect to the load device 200 a shown. In this example, the differential output of an operational amplifier 260 provides control signals to the switches. The rest of the temperature control system is not shown.

In some implementations, the switches of H-bridge circuit 210 are controlled using pulse-width modulated (PWM) signals. Such control typically allows the switches to be fully on (a 100% duty cycle for a given switching frequency) or fully off (0% duty cycle) and thereby limits power-dissipation that can occur when the switches are partially on, e.g., a condition not uncommon among linearly controlled H-bridges. Because PWM control can reduce power dissipation, it can permit the use of smaller transistors, which is a common design advantage. However, PWM operation typically creates large current spikes in the system. Many systems that use H-bridges, especially laser-based communication systems, are particularly sensitive to the noise generated by current fluctuations and the high-frequency switching associated with PWM control. Linear control of the H-bridge can avoid switching noise by controlling the on state of the switching devices precisely to the level needed to perform the right amount of cooling or heating. However, precisely controlling a number of transistors in an H-bridge configuration presents several challenges. So-called "dead-zones" between heating and cooling modes must be accommodated and the larger H-bridge devices may increase overall system cost, size, and/or heat budgets.

In the circuit of FIG. 2, a positive output signal (V+>V−) from operational amplifier 260 will cause transistor 240 and transistor 230 to turn on in a proportional manner, causing current to flow from the +5V rail to the emitter of transistor 240, through the TEC module 200, and into the emitter of transistor 230 before returning to ground. In the case of a negative output signal from operational amplifier 260, transistors 220 and 250 will turn on, and will result in a current flowing in the opposite direction through the TEC 200. The amount of voltage applied across TEC 200, and consequently the amount of current flowing through it, will be proportional to output voltage of operational amplifier 260. An important feature of this circuit is that, in general, at no time do all the transistors turn on, which would effectively short the power supply to ground. As effective as this implementation is, it does suffer from certain shortcomings.

Because the transistors are being used in emitter-follower configurations, there will typically be voltage drop (e.g., approximately 0.7 V) from the base to the emitter of each active device. This voltage drop will limit the maximum output voltage swing to considerably less than the 5V available at the supply. Another limitation of this circuit is that it requires high drive currents from amplifier 260 because of the finite DC current gain (HFE) of the transistors used in the bridge. H-bridge circuit 210 may also oscillate at RF frequencies, depending on the characteristics of the transistors used. One common solution to address these problems is use of a second H-bridge (formed across a small load resistor), which is used to control an H-bridge formed across the thermoelectric cooler device. While somewhat effective, this approach requires many additional components, e.g., four additional switches. Moreover, the added complexity of the circuit can complicate efforts to achieve better system performance such as linearized driver response, gain stabilization, and current limiting.

Accordingly, it is desirable to have a H-bridge circuits and control circuits for H-bridge circuits that provide continuous linear operation and current limiting while reducing the need for additional switches and reducing power losses of the non-TEC components in the system.

SUMMARY

It has been determined that device driver circuits based on H-bridges can be implemented to provide linear control of the H-bridge, reduce power losses, and reduce certain component size/cost. The driver circuits can use two feedback loops to operate the H-bridge in different regions and to guarantee that current flows through an H-bridge load device, such as a thermoelectric cooler, in only one direction at a given time. The H-bridge driver circuits can remove the possibility of high currents bypassing the load device and thus going directly through the switches on either side of the H-bridge driver. The H-bridge driver circuits also ensure careful control of the current applied to the H-bridge load device.

Accordingly, one aspect of the present invention provides a circuit including a comparator, a first amplifier, and a second amplifier for a device driver circuit. The comparator includes a first comparator input terminal operable to receive a first comparator input signal, a second comparator input terminal operable to receive a second comparator input signal, and a comparator output terminal operable to provide a signal for use in controlling at least one of a first switch and a second switch to the at least one of a first switch and a second switch. The first amplifier includes a first amplifier input terminal operable to receive a first amplifier input signal, a second amplifier input terminal operable to receive an error signal, and a first amplifier output terminal operable to provide a control signal to a third switch. The second amplifier includes a third amplifier input terminal operable to receive a second amplifier input signal, a fourth amplifier input terminal operable to receive the error signal, and a second amplifier output terminal operable to provide a control signal to a fourth switch. The first switch, the second switch, the third switch and the fourth switch form an H-bridge circuit.

Another aspect of the present invention provides a general method of controlling current supplied to a load device including but not limited to a thermoelectric device. An input signal is compared to a reference signal. At least one of a first switch and a second switch is selectively controlled according to a result of the comparing a first input signal to a reference signal. A third switch is selectively controlled using the first input signal and an error signal. A fourth switch is selectively controlled using an inverse of the first input signal and the error signal.

Still another aspect of the present invention provides a device driver circuit comprising first and second circuits. The first circuit is coupled to first and second terminals of a load device such as a thermoelectric device and is operable to control the direction of current flow through the load device. The second circuit is also coupled to the first and second terminals of the load device, but it is operable to control the amount of current supplied to the load device.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best-contemplated mode for carrying out the one or more devices and/or processes described herein. The description is intended to be illustrative and should not be taken to be limiting.

The circuits and techniques described and illustrated herein generally focus on current driving of a thermoelectric cooler (TEC) load. Nevertheless, application of these circuits and techniques need not be limited to providing power to TECs. Those of ordinary skill in the art will readily recognize that these circuits and techniques can be used to provide power to a variety of different load devices.

Figure 1:
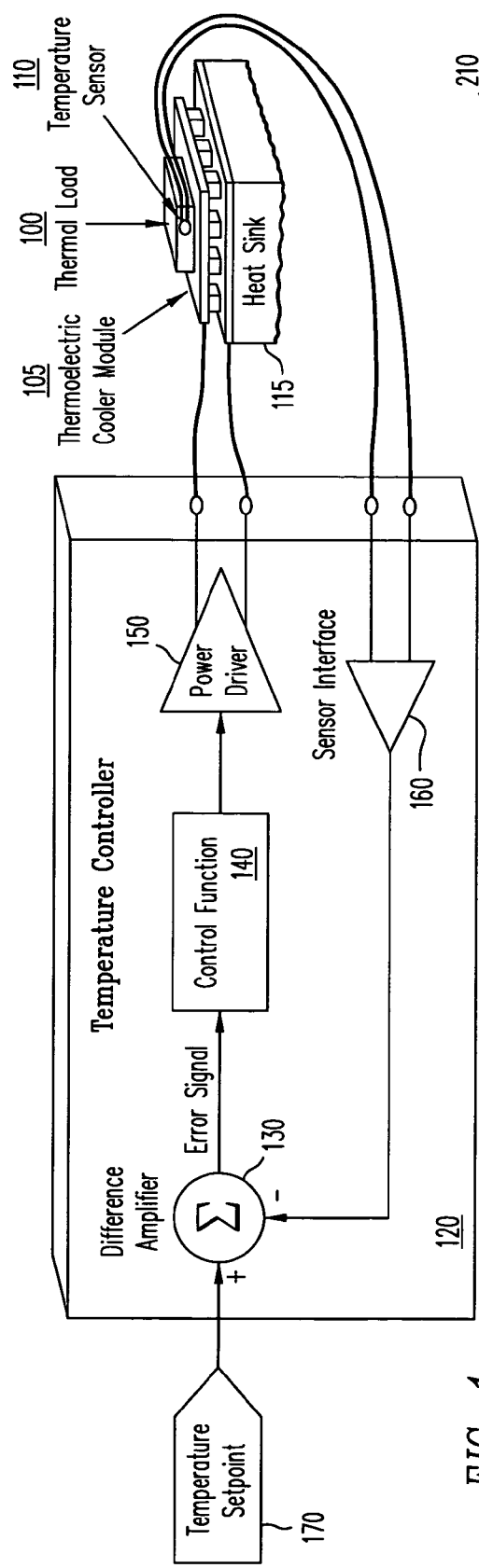
FIG. 1 illustrates a simplified block diagram of a feedback temperature control system using a thermoelectric cooler.
Figure 2:
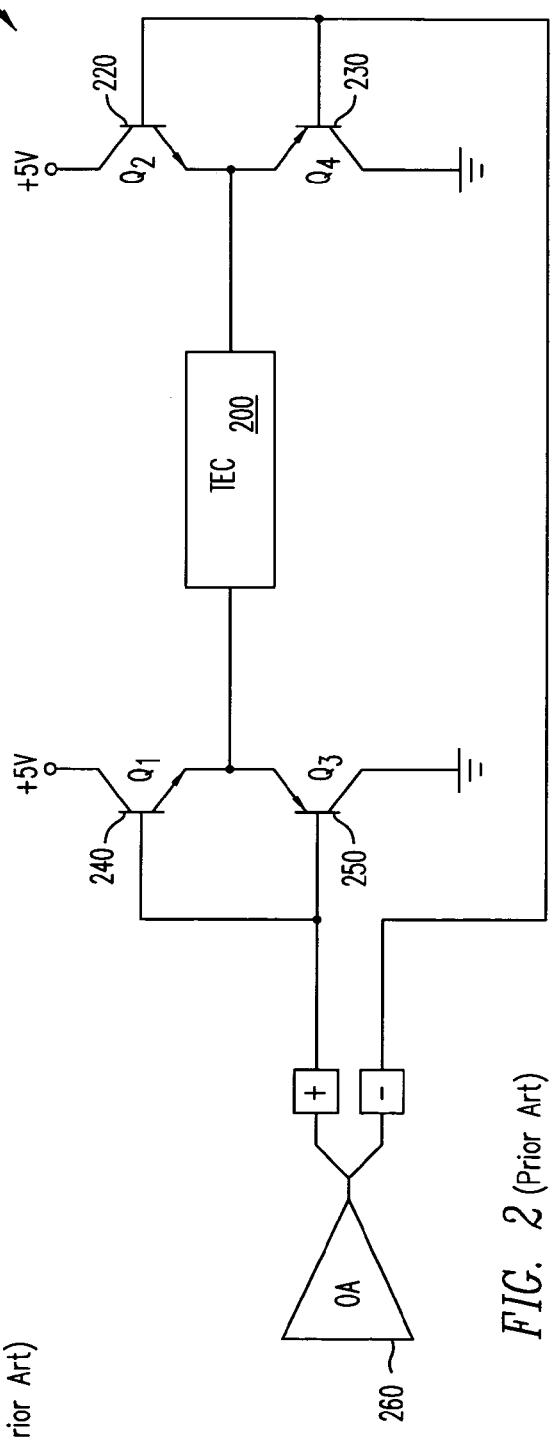
FIG. 2 illustrates a simplified schematic diagram of an H-bridge circuit topology.
Figure 3:
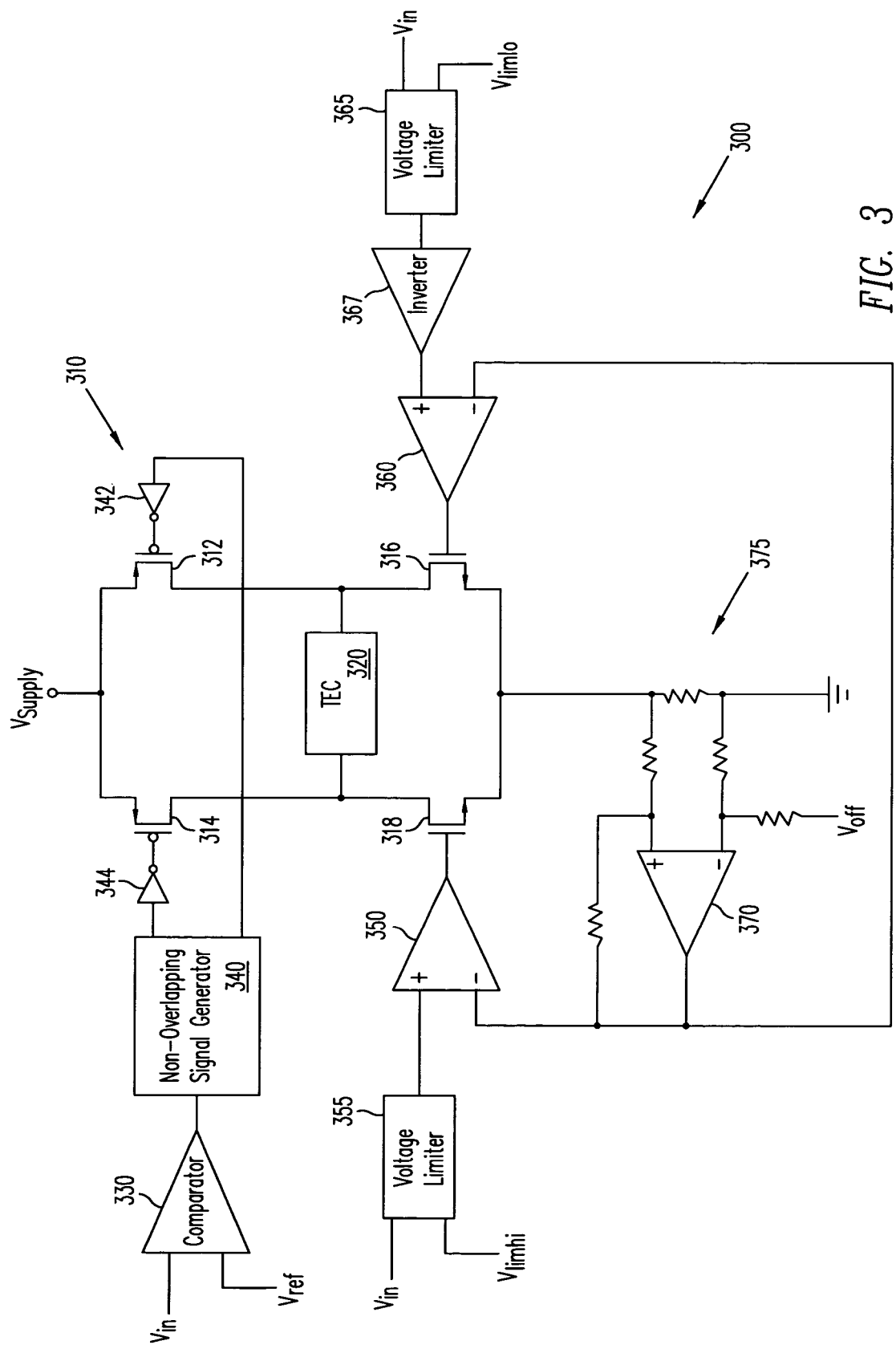
FIG. 3 illustrates a simplified schematic diagram of an H-bridge driver circuit according to an embodiment of the invention.

FIG. 3 illustrates a simplified schematic diagram of an H-bridge driver circuit 300 according to an embodiment of the invention. Because it is desirable to be able to control both the direction of current flow, e.g., whether a TEC driven by the circuit heats or cools, and the amount of current supplied to the TEC, e.g., the amount of heating or cooling, H-bridge driver circuit 300 separately controls the direction and amount of current supplied to a load device such as TEC 320.

To control the direction of current flow, comparator 330 receives in input signal $V_{in}$ that is compared with a reference signal $V_{ref}$. In general, the input signal is derived from some measurement associated with the load being driven. In the example where the load is a TEC, input signal $V_{in}$ is typically derived from a temperature measurement taken by a sensor located on or near the TEC and/or the device whose temperature the TEC is attempting to control. For example, input signal $V_{in}$ can be provided by a proportional-integral-derivative (PID) control circuit (not shown). PID controllers are commonly used linear control devices that automatically adjust some variable to hold a measurement, e.g., measured temperature, at a set point. The output of a PID controller will change in response to a change in measurement or set point. The proportional control typically involves a gain stage used to adjust the speed of the system's response. Integral control is implemented through the introduction of an integrator, and is used to provide the desired accuracy of the control system. Derivative action is typically introduced to control the damping in the system (i.e., the rate at which it reacts to a change). Tuning a PID control circuit can adjust the rise and settling times of the output signal, as well as the overshoot and accuracy of the system step response. In one example, a digital-to-analog converter is used to establish the temperature set point. A thermistor measures the temperature of the TEC and/or device being heated/cooled by the TEC. The difference between the measured temperature and the temperature set point is generally amplified and then fed to a PID circuit. By adjusting values associated with the PID circuit, e.g., external resistor value(s) and capacitor value(s), the loop can be tuned. The output of the PID circuit provides the signal used to drive a set current in the TEC.

The reference signal $V_{ref}$ is typically provided by a stable reference point, such as a bandgap reference having a low temperature coefficient. In one embodiment, power to H-bridge driver circuit 300 is supplied by a single supply voltage, e.g., a 5 volt supply, and the value of the reference signal is halfway between the supply voltage and ground. When the control signal (input signal $V_{in}$) is higher than the reference signal, the comparator output causes one PMOS switch (312 and 314) to be turned on and the other to be turned off. The switching pattern is reversed when the control signal is lower than the reference signal. The direction of the TEC current is thus determined.

Although comparator 330 can be used to directly control PMOS switches 312 and 314, the embodiment illustrated in FIG. 3 includes a non-overlapping signal generator 340 that is controlled by comparator 330 and provides output signals to digital drivers 342 and 344 which in turn provide control signals to PMOS switches 312 and 314 respectively. Additionally, comparator 330 can have a hysteresis to provide additional control features as discussed below.

For comparator 330 to function properly and to provide an output signal indicative of the input signals at the input of the comparator, comparator instabilities such as process related effects, temperature related effects, and topology effects should be accommodated. When processing time varying signals, particularly slowly varying signals, with small amounts of superimposed noise, comparators can produce multiple output transitions as the input crosses and re-crosses the comparison threshold established by the circuit, which in turn cause the comparator output to bounce back and forth between its defined output states.

One common solution to this problem is to provide feedback to the comparator resulting in a small amount of hysteresis of the switching point. This has the effect of separating the switching points in both directions, e.g., from low to high and from high to low, so that once a transition has started the input must undergo a significant reversal before the reverse transition can occur. Hysteresis is useful in situations where the signal is slow moving, or where an uncertain transition condition exists that would otherwise result in excessive noise on the comparator output. Comparator 330 typically features a small amount of hysteresis so as to accommodate a dead zone in the transfer function associated with H-bridge driver circuit 300. This dead zone is used to reduce or eliminate any switching oscillatory behavior due to noise. Additionally, the comparator is typically designed to switch faster than the loaded digital drivers so as to not adversely affect the digital driver rise and fall times.

The use of digital drivers 342 and 344 with comparator 330 helps to reduce the power dissipation on the PMOS devices so that smaller and less costly devices can be used. Using a PMOS device with sufficient gate voltage swing results in the device operating in the triode region. Power dissipation of this device is then a function of its low on-resistance and the TEC current, which can be much lower than devices that can operate in the saturation or forward active region. Moreover, the use of smaller PMOS devices typically means that smaller (or no) heat sinks are required for those devices, again reducing the cost, complexity, and potentially size of the implemented circuit. While a variety of different digital drivers can be used for drivers 342 and 344, care generally should be taken to select devices having proper rise and fall times with large load capacitance. The digital drivers should switch fast enough that there is no parasitic current flow around the load device, i.e., TEC 320. An effective way to accomplish this is to guarantee that one digital driver output is turned off before the other is turned on ("break-before-make"). Since digital drivers have relatively large and variable loading, non-overlapping signal generator 340 can be implemented to sense the outputs of the digital drivers. By using digital drivers 342 and 344 as the last stage of the non-overlapping signal generator 340, the switching on of one of the driver is always after the switching off of the other. Careful design of the digital voltage trip points allows the drivers to switch from heating to cooling without any shunt current flowing around the TEC 320.

Figure 4:
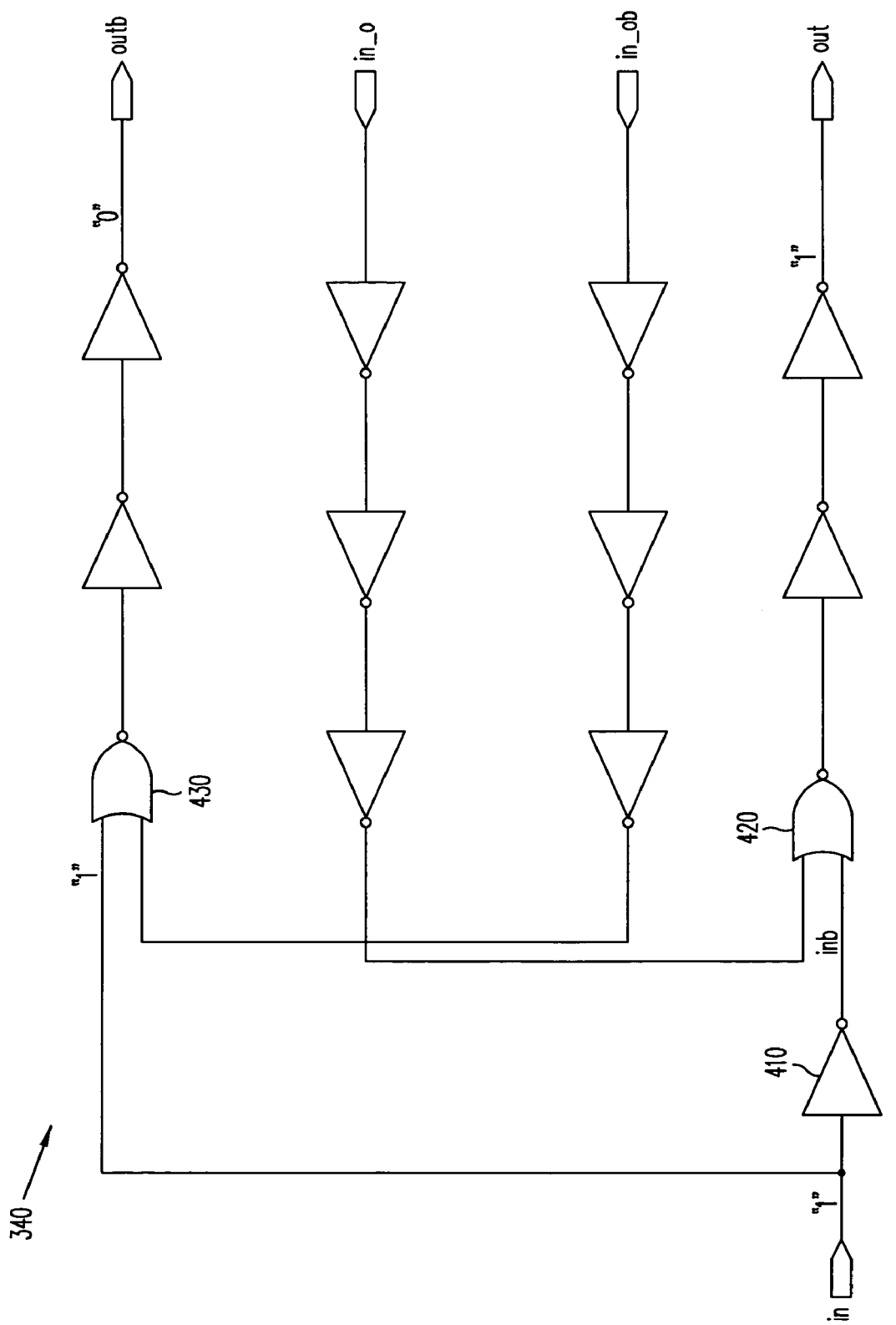
FIG. 4 is a simplified schematic diagram of a non-overlapping signal generator.

FIG. 4 illustrates one example of an implementation of non-overlapping signal generator 340. In FIG. 4, the output from comparator 330 is shown as input signal (in), and in this example it is illustrated as having a logic value of 1. In a first branch of non-overlapping signal generator 340 used to provide the output signal (out) to a first one of the digital drivers, the input signal (in) is inverted by inverter 410 and provided as one input (inb) into NOR gate 420. The other input to NOR gate 420 receives a signal derived from the value (in_o) of the control signal (gate voltage) provided by the second digital driver to its corresponding PMOS switch. The signal in_o passes through several inverters before it is provided to NOR gate 420. By comparing the output from comparator 330 with the current state of the gate voltage on one switch, this branch of non-overlapping signal generator 340 can make sure that the switch controlled by the first one of the digital drivers is not activated until the switch controlled by the second switch is turned off. The branch of non-overlapping signal generator 340 beginning with NOR gate 430 performs a similar function using the non-inverted comparator output and a signal derived from the value (in_ob) of the control signal provided by the second digital driver. Thus, in addition to ensuring that only one of the PMOS devices is on at a time, non-overlapping signal generator 340 also provides a portion of the protection from currents that bypass the TEC by going directly down one side of the H-bridge driver. With the comparator and switching logic, only one side of the H-bridge can be on at any time, avoiding the situation where both could be turned on simultaneously.

While FIG. 4 illustrates one example of a non-overlapping signal generator, those having ordinary skill in the art will recognize that a variety of other circuits can be used to generate two non-overlapping signals. For example, a two-bit counter can be used to provide a SET and RESET signal to produce a non-overlapping time of one-fourth of the period. Moreover, non-overlapping clock generators can be implemented with feedback from an internal node rather than from the output as shown.

In addition to controlling the direction of current flow through a load device such as TEC 320, H-bridge driver circuit 300 controls the amount of current supplied to the load device. While the amount of current to be supplied to the load device is generally based on the same input signal ($V_{in}$) derived from some measurement associated with the load (as described above), the control should be linear and predictable for ease of tuning of the control loop. A non-linear response between $V_{in}$ and current through the TEC can result in large variations in feedback loop open loop gain and phase, making compensation for stable operation difficult. To achieve this linear conversion between input voltage and the current applied to the load device, the linear operational amplifiers, or linear amplifiers, 350 and 360 drive NMOS switches 318 and 316 through the feedback loop provided by sense resistor 375 and error amplifier 370. The current being supplied to the load device at any given time is sensed through a sense resistor 375 at the bottom of the full H-bridge and the sensed voltage is amplified by error amplifier 370, which provides a corresponding error signal to each of linear amplifiers 350 and 360. This feedback enables a proportional output of current through the load device for a change in input error voltage to the H-bridge driver input.

In a further refinement, voltage limiters 355 and 365 are used to limit the control signals provided to linear amplifiers 350 and 360. For example, voltage limiter 355 receives as inputs the aforementioned signal $V_{in}$ and a limit signal $V_{limhi}$. In this case, $V_{limhi}$ is provided as a reference to voltage limiter 355 so that its output does not exceed $V_{limhi}$, a voltage near the positive supply rail. Similarly, voltage limiter 365 receives as inputs the aforementioned signal $V_{in}$ and a limit signal $V_{limlo}$, which limits the output of voltage limiter 365 to $V_{limlo}$, a value near ground. Thus, in one example where the supply voltage is +5 volts, $V_{limhi}$ has a value at or near +5 volts and voltage limiter 355 limits its output to that value, while $V_{limlo}$ has a value at or near ground and voltage limiter 365 ensures that $V_{in}$ does not fall below that value. Voltage limiters 355 and 365 generally limit the input signal range for linear amplifiers 350 and 360 in order to keep their operation in a stable region. Moreover, because of the local feedback loop controlling TEC current, there is a linear relationship between the voltage limit and the maximum current. By limiting the voltage, the thermoelectric cooler is protected from drawing too much current and having a catastrophic failure. H-bridge driver circuit 300 also includes an analog inverter 367 between the output of voltage limiter 365 and linear amplifier 360 so as to invert the input voltage about an inversion voltage. Again, in the example of a single supply voltage at +5 volts, inverter 367 can be configured to invert an input signal about the center point between the supply rail and ground, i.e., 2.5 volts. Thus, one side of H-bridge driver circuit 300 effectively operates above 2.5 volts and the other side operates below 2.5 volts. The 2.5 volt value is arbitrary and could in general be any desirable voltage.

With this configuration, H-bridge driver circuit 300 has two linearization loops, one for each of the NMOS devices under its control. One loop regulates TEC current flow when $V_{in}$ is greater than $V_{ref}$ and the other regulates TEC current flow when $V_{in}$ is less than $V_{ref}$. Only one of them is regulating (active) at any given time. The inactive loop is designed to shut off its appropriate NMOS device when not regulating TEC current. The loop associated with NMOS switch 318 includes switch 318 itself, sense resistor 375, linear amplifier 350 and error amplifier 370. $V_{in}$ (after applying any desired voltage limiting) is applied to the non-inverting terminal of linear amplifier 350. The feedback loop works to make the inverting terminal of linear amplifier 350 the same voltage as the non-inverting terminal. This means that the voltage on the input to the gate of the NMOS device 318 rises until a gate (turn on) voltage is exceeded and current starts to flow through switch 318 and sense resistor 375. The voltage generated by this current is then amplified by error amplifier 370 and fed back to linear amplifier 350. This process continues until the inverting input of linear amplifier 350 is roughly the same as $V_{in}$ as limited. The drain of the NMOS device 318 is connected one end of TEC 320, and the desired output is a current I. The transfer function for this feedback loop can be described as $I \cdot R \cdot G_{ea} = V_{in}$, where R is the resistance of sense resistor 375 and $G_{ea}$ is the gain of error amplifier 370. The simplified transfer function can be rewritten as $I/V_{in} = 1/(R \cdot G_{ea})$. Both R and $G_{ea}$ are typically very linear functions over the range of device operation, and thus the loop provides a linearly controlled current to TEC 320.

As noted above, the feedback loop works to make the inverting input of linear amplifier 350 equal to $V_{in}$ as limited by voltage limiter 355. Typical operation amplifiers used for this purpose have limits on how far their input signal can swing and how far their output signal can swing. Thus, for current limiting, voltage limiter 355 will not allow the input voltage to go above a set value and either drive linear amplifier 350 into an unstable region, or draw more TEC current than the maximum specified. Maximum TEC current can be controlled by the transfer function equation and knowledge of $V_{lim}$, e.g., $I_{max} = V_{lim}/(R \cdot G_{ea})$. Operation of the feedback loop associated with NMOS switch 316 (which includes switch 316, sense resistor 375, linear amplifier 360 and error amplifier 370) is similar. Again note that the limited control voltage is typically inverted about a set inversion voltage by inverter 367 as described above.

When the input signal $V_{in}$ is near the reference point, a dead zone is useful to prevent constant switching between heating and cooling modes. The dead zone is realized by the aforementioned comparator hysteresis. From the transfer function, the offset of the error amplifier is multiplied by the gain so that only when the sense voltage overcomes this amplified offset can the loop function properly. To minimize or remove any possibility of current leakage around the TEC, it is desirable that the error amplifier feedback loop output $V_{ref}$ when zero current flows through the TEC. Offset voltages and amplifier gain can cause an offset in the output of the error amplifier that leads to zero current not being achieved at $V_{ref}$. Trimming the error amplifier offset reduces or eliminates this leakage current. In some instances, this also has the effect of increasing the size of the dead zone, which in general is not desirable. Accordingly, an offset trim can be performed to reduce the offset. Such trim operations are typically performed by offset trim circuits (not shown) that are well known in the art.

A more thorough example of the operation of H-bridge driver circuit 300 is as follows. In this example, the supply voltage ($V_{supply}$) is +5 volts. $V_{limhi}$ is thus chosen to be at or near +5 volts, and $V_{limlo}$ is chosen to be at or near ground. Because the circuit is designed to work from a single supply, but the application requires a bipolar voltage swing to provide heating and cooling, a reference voltage is chosen. Above the reference will indicate the need to heat or cool and below the reference will indicate the need to cool or heat. The choice of reference can generally vary by design, but in this example 2.5 volts reference is chosen.

To understand the operation of the circuit, first assume that a 2.5 volt signal is applied to the $V_{in}$ signal input. With 2.5 volts input, neither limiter needs to limit the voltage, and thus both limiters act as buffers. Inverter 367 inverting amplifier will output 2.5 volts as well, so 2.5 volts appears at the non-inverting inputs of both linear amplifiers 350 and 360. The gain error amplifier 370 can also have a 2.5 volt offset built into its operation. Consequently, the only way that error amplifier 370 can generate a 2.5 volt output to balance the feedback loops is to have no current flow through the sense resistor 375. This results in both linear amplifier outputs being zero volts and no current flow. This effectively breaks the feedback loop, but is the stable operating point.

As the input $V_{in}$ rises slightly above 2.5 volts, the comparator hysteresis must be considered. The hysteresis is typically small, but if the input voltage is raised above the hysteresis value, the comparator will flip state. Non-overlapping signal generator 340 (with feedback from digital drivers 342 and 344) will guarantee that the two transistors 312 and 314 will not be on at the same time regardless of load. Thus, comparator 330, non-overlapping signal generator 340, and digital drivers 342 and 344 determine the direction of current flow through TEC 320.

As the input voltage rises above 2.5 volts, linear amplifier 350 has a positive voltage between its inputs. Due to the inversion around the reference voltage, linear amplifier 360 has a negative input voltage that keeps NMOS switch 316 in an off state. This positive voltage between inputs of linear amplifier 350 causes its output to rise in voltage to try and correct for the "error" on its inputs. Eventually the voltage will rise high enough that the NMOS device 318 will turn on and current will start to flow from the $V_{supply}$ through one of the PMOS devices, through TEC 320 and through the NMOS device being turned on into resistor 375. When the current is large enough to create a voltage at the input to error amplifier 370 that is equivalent to $V_{in}$, the circuit will be in steady state. The output current is a function of the input voltage as described above.

If the input voltage drops below 2.5 volts, the left half circuit will turn off due to the negative differential voltage across linear amplifier 350. The right half circuit will turn on in much the same manner as the left half side did for a voltage above 2.5 volts. Since the inversion performed by 367 is around 2.5 volts, any "negative" input below 2.5 volts (where the difference is denoted by dVolts) will cause a "positive" voltage on the inverter's output that is dVolts +2.5 volts. The comparator will also trip and change the current direction when the $V_{in}$ is one half the hysteresis below the 2.5 volt reference.

Because all of the linear switching is done with near zero current flowing through TEC 320, there are little or no glitches or large non-linear current spikes. The PMOS devices tend to share channel charge when one is switching off and the other is switching on, and most of this charge is returned to the supply—a low impedance. Since the PMOS devices are operated in the triode region, they consume less power and can therefore be smaller devices, again reducing channel charge. Moreover, by building the driver in the manner described, only one side of the bridge is in operation at any time. The two separate loops that go to zero current at the zero heating and cooling point along with the PMOS device drivers and switching circuit remove the possibility of high currents bypassing the load device and going directly through the MOSFET's on either side of the H-bridge driver. A small shunt current is possible, but limited by leakage.

In a typical implementation, H-bridge driver circuit 300 does not specifically include switches 312, 314, 316, 318, TEC 320, or sense resistor 375. These devices are external devices, while some or all of the remaining components are formed in a single integrated circuit. In still another embodiment, such an H-bridge driver circuit (again not including external components) is included as part of a programmable analog integrated circuit. Programmable analog integrated circuits typically use some type of programmable analog circuit block architecture that permits change in one or more functions of the analog circuit without changing the topology of the circuit elements, thereby reducing changes in voltage offset and distortion created by changes in topology and making configuration or reconfiguration simpler for users.

Figure 5:
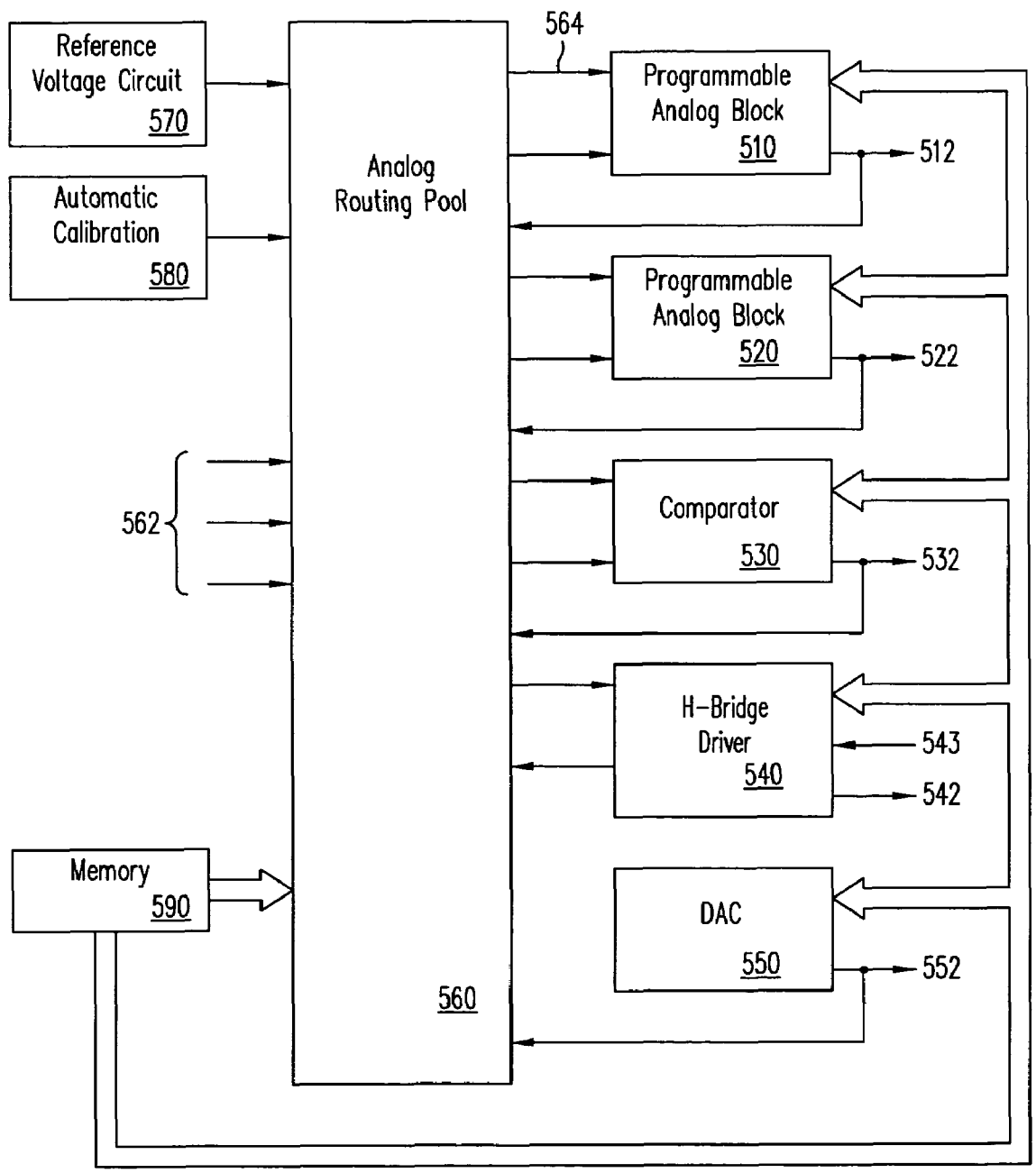
FIG. 5 is a simplified block diagram of a programmable analog integrated circuit including an H-bridge driver circuit.

FIG. 5 illustrates a programmable analog integrated circuit 500 including two programmable analog circuit blocks 510 and 520, a comparator block 530, an H-bridge driver block 540 (e.g., based on the H-bridge drivers described above), a digital-to-analog converter (DAC) 550, and an analog routing pool 560. Programmable analog integrated circuit 500 also includes support circuitry coupled to routing pool 560, such as voltage reference circuit 570, power-on auto-calibration circuitry 580, and configuration memory 590. Single ended or differential input signals 562 are received by analog routing pool 560, and can be routed to any of programmable analog circuit blocks 510 and 520, comparator block 530, H-bridge driver block 540, and external output terminals (not shown), depending upon the programming of analog routing pool 560. Analog routing pool 560 also controls the routing of the output signals of each of the programmable analog circuit blocks 510 and 520, comparator block 530, H-bridge driver block 540, differential output DAC 550, and external output terminals.

The routing of the analog routing pool is determined by information stored in memory 590. More specifically, individual bits stored within memory 590 controls whether individual switches of analog routing pool 560 are on or off. Memory 590 also stores similar information for programming the programmable analog circuit blocks 510 and 520, comparator 530, H-bridge driver 540, and DAC 550.

Memory 590 can be implemented using both non-volatile and volatile memories, such as static read only memory, dynamic random access memory, static random addressable memory, shift registers, electronically erasable ($E^2$) memory, and flash memory. Reference voltage circuit 570 provides a stable voltage reference, e.g., 2.5 V, to analog routing pool 560 for use throughout programmable analog integrated circuit 500.

Programmable analog circuit blocks 510 and 520 can include operational amplifiers, resistors, capacitors, and other basic analog circuit elements. Examples of typical programmable analog circuit blocks 510 and 520 can be found in U.S. Pat. No. 5,574,678, entitled "Continuous Time Programmable Analog Block Architecture," by James L. Gorecki, (the "Gorecki patent") which is incorporated herein by reference in its entirety. In general, programmable analog circuit blocks 510 and 520 flexibly implement basic analog circuit functions such as precision filtering, summing/differencing, gain/attenuation, and integration.

Programmable analog circuit blocks 510 and 520 can be implemented as single-ended circuit blocks, although in some embodiments, they are fully differential from input to output. Note that for simplicity in FIG. 5 each of input signals 562, each of the two input signals to programmable analog circuit blocks 510 and 520, each of the two input signals to comparator 530, and each of the input or output signals 512, 522, 532, 542, 543 and 552 are shown as single lines, even though they each may represent either a singled ended signal or a differential signal pair. The circuits illustrated can be implemented with fully differential circuit pathways in some embodiments, although single-ended operation is possible by design, by programming, or via conversion circuits at the input and output nodes. Differential architecture substantially increases dynamic range as compared to single-ended I/O, while affording improved performance with regard to circuit specifications such as common mode rejection and total harmonic distortion. Moreover, differential operation affords added immunity to variations in the circuit's power supply.

Automatic calibration circuit 580 is used to calibrate circuit elements of programmable analog integrated circuit 500, such as programmable analog circuit blocks 510 and 520. Typically, a calibration mode is initiated by, for example, a circuit power on signal (i.e., anytime the circuit is turned on) or by a specific calibrate command signal that allows calibration to be requested at any time. In one embodiment, simultaneous successive approximation routines (SAR) are used to determine the amount of offset error referred to each of the output amplifiers used in programmable analog circuit blocks 510 and 520. That error is then nulled by a calibration DAC for each output amplifier. The calibration constant can be stored in memory 590, but is preferably recomputed each time programmable analog integrated circuit 500 enters a calibration mode.

In many applications using comparators, it is desirable to compare a signal to a known reference. This can be accomplished with programmable analog integrated circuit 500 in a variety of ways. For example, a reference signal can be coupled to one of the inputs 562, and subsequently routed to one or both of comparator 530 and H-bridge driver 540 via analog routing pool 560. Similarly, an output signal from one of the programmable analog circuit blocks 510 and 520 can be routed to one or both of the comparator 530 and H-bridge driver 540 via analog routing pool 560. Finally, DAC 550 can be programmed to produce an analog signal that is routed to one or both of comparator 530 and H-bridge driver 540 via analog routing pool 560.

Regarding terminology used herein, it will be appreciated by one skilled in the art that any of several expressions may be equally well used when describing the operation of a circuit including the various signals and nodes within the circuit. Any kind of signal, whether a logic signal or a more general analog signal, takes the physical form of a voltage level (or for some circuit technologies, a current level) of a node within the circuit. Such shorthand phrases for describing circuit operation used herein are more efficient to communicate details of circuit operation, particularly because the schematic diagrams in the figures clearly associate various signal names with the corresponding circuit blocks and node names.

While the disclosed devices and techniques have been described in light of the embodiments discussed above, one skilled in the art will recognize that certain substitutions may be easily made in the circuits without departing from the teachings of this disclosure. For example, a variety of logic gate structures may be substituted for those shown, and still preserve the operation of the circuit, in accordance with DeMorgan's law. Also, many circuits using NMOS transistors may be implemented using PMOS transistors instead, as is well known in the art, provided the logic polarity and power supply potentials are reversed. In this vein, the transistor conductivity-type (i.e., N-channel or P-channel) within a CMOS circuit may be frequently reversed while still preserving similar or analogous operation.

The disclosed devices and techniques are not limited by any transistor or capacitor sizes or by voltage levels disclosed herein. Moreover, implementation of the disclosed devices and techniques is not limited by CMOS technology, and thus implementations can utilize NMOS, PMOS, bipolar or other technologies. Nevertheless, using MOSFET power devices directly accomplishes the goal of reducing driver power dissipation due to the high input impedance of the MOSFET device. In contrast, the base current for a bipolar power device can cause considerable on chip thermal variations.

Although the present invention has been described with respect to a specific preferred embodiment thereof, various changes and modifications may be suggested to one skilled in the art and it is intended that the present invention encompass such changes and modifications that fall within the scope of the appended claims.

What is claimed is:

1. A circuit comprising:
   a comparator operable to receive an input signal and a reference signal and to provide an output signal to at least one of a first switch and a second switch coupled to a thermoelectric cooler;
   a first amplifier operable to receive the input signal and an error signal and to provide a control signal to a third switch coupled to the thermoelectric cooler; and
   a second amplifier operable to receive an inverse of the input signal and the error signal and to provide a control signal to a fourth switch coupled to the thermoelectric cooler.

2. The circuit of claim 1 wherein the input signal comprises a control signal derived from a temperature measurement and wherein the reference signal comprises a reference voltage.

3. The circuit of claim 1 wherein the comparator further provides a hysteresis effect to the output signal for use in controlling at least one of the first switch and second switch.

4. The circuit of claim 1 further comprising:
   a non-overlapping signal generator coupled between the comparator and first and second switches, the non-overlapping signal generator configured to provide non-overlapping control signals to the first and second switches.

5. The circuit of claim 4 further comprising:
   a digital driver, wherein the non-overlapping signal generator is coupled to an input terminal of the digital driver, and wherein the non-overlapping signal generator is further configured to receive a signal from an output terminal of the digital driver.

6. The circuit of claim 1 further comprising:
   a voltage limiter coupled to the first amplifier and configured to receive a control signal derived from a temperature measurement, wherein the voltage limiter uses the control signal to provide the input signal to the first amplifier, and wherein the voltage limiter is operable to limit the magnitude of the input signal.

7. The circuit of claim 1 further comprising:
   an error amplifier coupled to the first amplifier and the second amplifier, wherein the error amplifier is configured to sense a voltage across a sense resistor and to provide the error signal based on the voltage across the sense resistor.

8. The circuit of claim 1 wherein at least one of the first amplifier and the second amplifier is a linear operational amplifier.

9. The circuit of claim 1 further comprising:
   a programmable analog circuit block, the programmable analog circuit block having analog circuit block positive and negative input terminals and analog circuit block positive and negative output terminals;
   an analog routing pool, the analog routing pool controlling the routing of at least one of: a signal provided by the programmable analog circuit block, a signal provided to the programmable analog circuit block, and a control signal derived from a temperature measurement.

10. A method of controlling current supplied to a load device, the method comprising:
   comparing an input signal to a reference signal;
   selectively controlling at least one of a first switch and a second switch according to a result of the comparing a first input signal to a reference signal;
   selectively controlling a third switch using the first input signal and an error signal; and
   selectively controlling a fourth switch using an inverse of the first input signal and the error signal.

11. The method of claim 10 wherein the selectively controlling at least one of a first switch and a second switch according to a result of the comparing further comprises:
   generating a first control signal depending on the result of the comparing;
   generating a second control signal depending on the result of the comparing, wherein the first control signal and the second control signal are non-overlapping signals;
   transmitting the first control signal to the first switch; and
   transmitting the second control signal to the second switch.

12. The method of claim 10 further comprising:
   amplifying a difference between the first input signal and the error signal; and
   amplifying a difference between the inverse of the first input signal and the error signal.

13. The method of claim 10 wherein the selectively controlling a third switch using the first input signal and an error signal further comprises:
   limiting the first input signal to a voltage limit.

14. The method of claim 10 further comprising
   measuring a voltage across a sense resistor; and
   amplifying the voltage across a sense resistor to produce the error signal.

15. The method of claim 10 wherein the input signal is derived from a temperature measurement.

16. The method of claim 10, wherein the load device is coupled to the four switches, and the first and second switches are operable to control the direction of current flow through the device and the third and fourth switches are operable to control the amount of current supplied to the device.

17. The method of claim 16, wherein the load device is a thermoelectric device.

18. A circuit comprising:
   a first circuit including a first pair of transistors coupled to first and second terminals of a thermoelectric device and operable to control the direction of current flow through the device and a comparator operable to receive an input signal and a reference signal and to provide an output signal to at least one of the first pair of transistors; and
   a second circuit including a second pair of transistors coupled to the first and second terminals of the thermoelectric device and operable to control the amount of current supplied to the device.

19. The circuit of claim 18 wherein the second circuit further comprises:
   a first amplifier operable to receive an input signal and an error signal and to provide a control signal to one of the second pair of transistors; and
   a second amplifier operable to receive an inverse of the input signal and the error signal and to provide a control signal to the other of the second pair of transistors.

* * * * *